United States Patent
Katayama

(10) Patent No.: US 7,136,344 B2
(45) Date of Patent: Nov. 14, 2006

(54) OPTICAL HEAD DEVICE AND OPTICAL INFORMATION RECORDING/REPRODUCING APPARATUS

(75) Inventor: Ryuichi Katayama, Tokyo (JP)

(73) Assignee: NEC Corporation (JP)

( * ) Notice: Subject to any disclaimer, the term of this patent is extended or adjusted under 35 U.S.C. 154(b) by 78 days.

(21) Appl. No.: 10/508,891

(22) PCT Filed: Feb. 24, 2004

(86) PCT No.: PCT/JP2004/002106

§ 371 (c)(1),
(2), (4) Date: Sep. 23, 2004

(87) PCT Pub. No.: WO2004/097815

PCT Pub. Date: Nov. 11, 2004

(65) Prior Publication Data

US 2005/0128896 A1    Jun. 16, 2005

(30) Foreign Application Priority Data

Apr. 25, 2003   (JP) .............................. 2003-122503

(51) Int. Cl.
*G11B 7/00* (2006.01)

(52) U.S. Cl. .............................. 369/112.12; 369/44.23; 369/112.05; 369/112.07

(58) Field of Classification Search ............ 369/112.07
See application file for complete search history.

(56) References Cited

U.S. PATENT DOCUMENTS

| | | | | |
|---|---|---|---|---|
| 5,761,174 A | * | 6/1998 | Takeda et al. ......... | 369/112.07 |
| 6,088,315 A | * | 7/2000 | Ando ...................... | 369/47.41 |
| 6,282,164 B1 | * | 8/2001 | Katayama .............. | 369/112.12 |
| 6,400,664 B1 | * | 6/2002 | Shimano et al. ........ | 369/44.37 |
| 6,407,973 B1 | * | 6/2002 | Ophey .................... | 369/112.07 |
| 6,501,601 B1 | * | 12/2002 | Takasuka et al. ........... | 359/569 |
| 6,788,628 B1 | * | 9/2004 | Katayama ............... | 369/44.37 |
| 6,804,180 B1 | * | 10/2004 | Katayama ............... | 369/44.32 |
| 7,012,875 B1 | * | 3/2006 | Shimano et al. ....... | 369/112.02 |
| 2004/0196771 A1 | * | 10/2004 | Shimano et al. ....... | 369/112.03 |

FOREIGN PATENT DOCUMENTS

| | | |
|---|---|---|
| JP | 04-168631 | 6/1992 |
| JP | 09-081942 | 3/1997 |
| JP | 2001-250250 | 9/2001 |
| JP | 2001-307358 | 11/2001 |
| JP | 2002-183989 | 6/2002 |
| JP | 2003-51130 | 2/2003 |

\* cited by examiner

*Primary Examiner*—Thang V. Tran
*Assistant Examiner*—Parul Gupta
(74) *Attorney, Agent, or Firm*—Ostrolenk, Faber, Gerb & Soffen, LLP

(57) ABSTRACT

Light emitted from a semiconductor laser (1) is split by a diffractive optical element (3a) into a main beam and sub-beams. The diffractive optical element (3a) is divided into four regions by a straight line parallel to a tangential direction of a disc (7) and a straight line parallel to a radial direction of the disc (7). A phase of grating in two regions arranged diagonally and a phase of grating in the other two regions arranged diagonally are different from each other by π. A focused spot of the main beam and focused spots of the sub-beams are located on the same track. A focusing error signal is detected by a differential astigmatism method, using the main beam and the sub-beams.

15 Claims, 11 Drawing Sheets

US 7,136,344 B2

OPTICAL HEAD DEVICE AND OPTICAL INFORMATION RECORDING/REPRODUCING APPARATUS

CROSS REFERENCE TO RELATED APPLICATION

This is a U.S. National stage of application No. PCT/JP2004/002106, filed on Feb. 24, 2004. Priority is claimed on that application and on the following application: Country: Japan, Application No. 2003-122503, Filed: Apr. 25, 2003 The PCT International application was published in the Japanese language.

TECHNICAL FIELD

The present invention relates to an optical head device and an optical information recording or reproducing apparatus that perform recording and/or reproduction for an optical recording medium. More particularly, the present invention relates to an optical head device that can obtain a favorable focusing error signal by a differential astigmatism method for a plurality of types of optical recording media each having a different track pitch, and an optical information recording or reproducing apparatus that incorporates such an optical head device therein.

BACKGROUND ART

An astigmatism method is known as a detection method for detecting a focusing error signal in an optical head device incorporated in an optical information recording or reproducing apparatus. The astigmatism method has a feature that an optical system can be integrated with an optical system for detecting a tracking error signal by a push-pull method and a differential phase detection method and an optical system for detecting a reproduction signal, as compared with a knife-edge method and a spot-size method.

On the other hand, as a method for increasing the density of an optical recording medium, land/groove recording is known in which recording and reproduction are performed for both lands and grooves of the optical recording medium. A write-once optical recording medium and a rewritable optical recording medium typically have a groove used for tracking. The lands and grooves correspond to concave portions and convex portions, respectively, when the optical recording medium is seen from a side on which light is incident.

In a case where a focus error signal is detected by an astigmatism method for such an optical recording medium for land/groove recording, a focusing error signal obtained when light is reflected from the land is different from that obtained when light is reflected from the groove. In other words, interrelationship between the defocus amount of the optical recording medium and the level of the focusing error signal is different between a case where a focused spot formed on the optical recording medium by the optical head device is located on the land and a case where that focused spot is located on the groove. Thus, in a case where the optical head device makes an access between an inner peripheral portion and an outer peripheral portion of the optical recording medium, for example, when the focused spot formed on the optical recording medium by the optical head device crosses the grooves of the optical recording medium, the level of the focusing error signal changes between the level obtained when the focused spot is located on the land and the level obtained when the focused spot is located on the groove. This change is called as a groove-crossing noise. When the groove-crossing noise occurs, a focusing-servo operation becomes unstable and therefore prevents recording and reproduction from being performed normally.

Thus, as a detection method of a focusing error signal that can suppress the above-described groove-crossing noise, a differential astigmatism method has been proposed (see Japanese Patent Laid-Open Publication No. Hei 4-168631, for example). FIG. 5 is a block diagram of a conventional optical head device that detects a focusing error signal by the differential astigmatism method. This optical head device is described in Japanese Patent Laid-Open Publication No. Hei 4-168631.

As shown in FIG. 5, this conventional optical head device is provided with a semiconductor laser 1. In this conventional optical head device, along a traveling path of laser light emitted from the semiconductor laser 1, a collimator lens 2 for collimating the laser light emitted from the semiconductor laser 1, a diffractive optical element 3b for transmitting and diffracting light incident thereon, a beam splitter 11 for transmitting a part of light incident thereon and reflecting the remaining part of the incident light toward a predetermined direction, and an objective lens 6 for converging collimated light incident thereon are provided in that order. A disc 7 that is an optical recording medium is arranged at a focus of the objective lens 6. Please note that a direction perpendicular to the sheet of FIG. 5 is a tangential direction of a track in a region of the disc 7 which is irradiated with laser light (hereinafter, simply referred to as a tangential direction), while a vertical direction in FIG. 5 is a radial direction of the region of the disc 7 which is irradiated with the laser light (hereinafter, simply referred to as a radial direction). Moreover, along a traveling path of light reflected by the beam splitter 11, a cylindrical lens 8, a lens 9, and a photodetector 10 are provided in that order. The photodetector 10 is midway between two focal lines formed by a compound lens formed by the cylindrical lens 8 and the lens 9.

FIG. 6 is a plan view of the diffractive optical element 3b. As shown in FIG. 6, the diffractive optical element 3b includes a diffraction grating 23 formed on its entire surface. A direction in which the diffraction grating 23 extends is approximately parallel to the radial direction of the disc 7, but it is slightly inclined with respect to the radial direction. The diffraction grating 23 has a pattern of straight lines arranged at equal pitches. Please note that a circle shown with broken line in FIG. 6 represents an effective region of the objective lens 6.

In the conventional optical head device shown in FIGS. 5 and 6, the semiconductor laser 1 emits laser light, and this light is collimated by the collimator lens 2. Then, the collimated light is divided by the diffractive optical element 3b into three, i.e., zero-th order light as a main beam and plus and minus first order diffracted light as sub-beams. A part of these light beams passes through the beam splitter 11 and is then focused onto the disc 7 by the objective lens 6. Then, these light beams are reflected by the disc 7. The three reflected light beams from the disc 7 pass through the objective lens 6 in the reverse direction, and a part of those light beams is reflected by the beam splitter 11. The reflected part passes through the cylindrical lens 8 and the lens 9 and is then received by the photodetector 10.

FIG. 7 is a plan view showing positions of focused spots on the disc 7. Focused spots 14a, 14d, and 14e are spots of the zero-th order light, plus first order diffracted light and minus first order diffracted light from the diffractive optical element 3b, respectively. The focused spot 14a is located on a track 13; the focused spot 14d is located on a right track adjacent to the track 13; and the focused spot 14e is located on a left track adjacent to the track 13. When the track 13 is a land, the right and left tracks adjacent to the track 13 are grooves. When the track 13 is a groove, the right and left tracks adjacent to the track 13 are lands.

FIG. 8 is a plan view showing a light-receiving portion of the photodetector 10 and positions of light spots on the photodetector 10. As shown in FIG. 8, the photodetector 10 has three square light-receiving regions 15x, 15y, and 15z each of which is formed by four light-receiving portions arranged in a matrix of 2×2. That is, the light-receiving region 15x is divided into four square light-receiving portions 15a through 15d; the light-receiving region 15y is divided into four square light-receiving portions 15e through 15h; and the light-receiving region 15z is divided into four square light-receiving portions 15i through 15l. When light transmitted by the lens 9 is incident on the photodetector 10, light spots 16a, 16d, and 16e are formed on the light-receiving regions 15x, 15y, and 15z, respectively. Each of the light-receiving portions 15a through 15l outputs an electric signal in accordance with the intensity of light incident thereon.

The light spot 16a is a spot of the zero-th order light of the diffractive optical element 3b and is received by the light-receiving portions 15a through 15d. The light spot 16d is a spot of the plus first order diffracted light of the diffractive optical element 3b and is received by the light-receiving portions 15e through 15h. The light spot 16e is a spot of the minus first order diffracted light of the diffractive optical element 3b and is received by the light-receiving portions 15i through 15l. Because of an effect of the cylindrical lens 8 and the lens 9, the intensity distribution in the light spot in the tangential direction and that in the radial direction are interchanged.

An extending direction of a boundary between the light-receiving portions 15e and 15f, a boundary between the light-receiving portions 15g and 15h, a boundary between the light-receiving portions 15a and 15b, a boundary between the light-receiving portions 15c and 15d, a boundary between the light-receiving portions 15i and 15j, and a boundary between the light-receiving portions 15k and 15l corresponds to the tangential direction of the disc 7 in the focused spots 14a, 14d, and 14e on the disc 7 shown in FIG. 7. Moreover, an extending direction of a boundary between the light-receiving portions 15e and 15g, a boundary between the light-receiving portions 15f and 15h, a boundary between the light-receiving portions 15a and 15c, a boundary between the light-receiving portions 15b and 15d, a boundary between the light-receiving portions 15i and 15k, and a boundary between the light-receiving portions 15j and 15l corresponds to the radial direction of the disc 7 in the focused spots 14a, 14d, and 14e on the disc 7 shown in FIG. 7.

Assuming that electric signals output from the light-receiving portions 15a through 15l are represented by V15a through V15l, respectively, a focusing error signal FEM of the main beam by an astigmatism method is obtained by the following expression 1.

$$FEM = (V15a + V15d) - (V15b + V15c) \quad (1)$$

A focusing error signal FES of the sub-beams by an astigmatism method is obtained by following expression 2.

$$FES = (V15e + V15h + V15i + V15l) - (V15f + V15g + V15j + V15k) \quad (2)$$

Moreover, a focusing error signal FE by a differential astigmatism method is obtained by following expression 3, where a ratio of the light amount of the main beam to the sub-beams is represented by K.

$$FE = FEM + K \times FES \quad (3)$$

FIGS. 9(a) through (c) are graphs showing exemplary various focusing error signals that were calculated, in each of which the horizontal axis represents the defocus amount of the disc 7 and the vertical axis represents the level of the focusing error signal that was normalized with a sum signal. FIG. 9(a) shows the focusing error signal of the main beam calculated by the above-mentioned expression 1; FIG. 9(b) shows the focusing error signal of the sub-beams calculated by above-mentioned expression 2; and FIG. 9(c) shows the focusing error signal by a differential astigmatism method calculated by above-mentioned expression 3. In FIGS. 9(a) through (c), a black circle (●) represents the focusing error signal in a case where the focused spot of the main beam is located on the land, while a white circle (○) represents the focusing error signal in a case where the focused spot of the main beam is located on the groove. A condition of calculation that was set is as follows: the wavelength of the light source is 405 nm, numerical aperture of the objective lens 6 is 0.65, a track pitch (the width of the land and the groove) is 0.34 μm, and the depth of the groove is 45 nm.

When the focusing error signal is detected by a simple astigmatism method using the main beam only, as shown in FIG. 9(a), dependency of the focusing error signal on the defocus amount on the land is different from that on the groove. Thus, every time the light spot on the disc crosses the land and the groove, the groove-crossing noise is generated. On the other hand, when the focusing error signal is detected by a differential astigmatism method using the main beam and the sub-beams, as shown in FIG. 9(c), the defocus-amount dependency of the focusing error signal on the land is the same as that on the groove. Thus, generation of the groove-crossing noise can be suppressed. This is because the defocus-amount dependency of the focusing error signal of the main beam shown in FIG. 9(a) is opposite to that of the sub-beams shown in FIG. 9(b), namely, that of the land and that of the groove are opposite to each other. Thus, by adding both the defocus-amount dependency of the focusing error signal of the main beam and that of the sub-beams, the difference between the land and the groove can be canceled out. In other words, the sum of the signal level shown with the black circle in FIG. 9(a) (signal level of the main beam when the spot of the main beam is located on the land) and the signal level shown with the black circle in FIG. 9(b) (signal level of the sub-beams when the spot of the main beam is located on the land) is substantially equal to the sum of the signal level shown with the white circle in FIG. 9(a) (signal level of the main beam when the spot of the main beam is located on the groove) and the signal level shown with the white circle in FIG. 9(b) (signal level of the sub-beams when the spot of the main beam is located on the groove).

However, in order to obtain a favorable focusing error signal by a differential astigmatism method in the conventional optical head device shown in FIG. 5, it is necessary that the focused spot of the main beam be arranged away from the focused spots of the sub-beams by one track pitch in the radial direction on the disc 7. Thus, when there are a plurality of types of optical recording media each having a different track pitch, the conventional optical head device can obtain a favorable focusing error signal by a differential astigmatism method only for one of the optical recording media.

By the way, in a case of detecting a tracking error signal by a push-pull method in an optical head device, when an objective lens moves in a radial direction of an optical recording medium, offset is generated in the tracking error signal, thus preventing recording and reproduction from being performed normally. As a detection method of the tracking error signal that can suppress the above offset, a differential push-pull method has been proposed. Moreover, a differential push-pull method that can accommodate a plurality of types of optical recording media each having a different track pitch, has been proposed. Therefore, as for the differential astigmatism method, in order to accommodate a plurality of types of optical recording media each having a different track pitch, respectively, employing the same structure can be considered.

As a conventional optical head device that detects a tracking error signal by a differential push-pull method for a plurality of types of optical recording media each having a different track pitch, an optical head device described in Japanese Patent Laid-Open Publication No. Hei 9-81942 is known. In this optical head device, the diffractive optical element 3*b* in the conventional optical head device shown in FIG. 5 is replaced with a diffractive optical element 3*c* described below.

FIG. 10 is a plan view of the diffractive optical element 3*c*. As shown in FIG. 10, the diffractive optical element 3*c* is divided into two regions 12*e* and 12*f* by a straight line that passes through an optical axis of incident light and is parallel to the tangential direction of the disc 7. Each of the regions 12*e* and 12*f* has a diffraction grating 23 formed therein. A direction in which the diffraction grating 23 extends is the radial direction of the disc 7 and a pattern of the grating is formed by straight lines arranged at equal pitches. Moreover, the phase of the grating in the region 12*e* is shifted from that in the region 12*f* by π (corresponding to a half pitch). Thus, the phase of plus first order diffracted light from the region 12*e* and the phase of plus first order diffracted light from the region 12*f* are shifted from each other by π, while the phase of minus first order diffracted light from the region 12*e* and the phase of minus first order diffracted light from the region 12*f* are shifted from each other by π. Please note that a circle shown with broken line represents an effective region of the objective lens 6.

FIG. 11 is a plan view showing positions of focused spots on the disc 7. Focused spots 14*a*, 14*f*, and 14*g* are spots of zero-th order light, plus first order diffracted light, and minus first order diffracted light from the diffractive optical element 3*c*, respectively. These three focused spots are located on the same track 13. Incidentally, the track 13 is a land or groove. Since the phase in the sub-beam on the left side of a straight line, which passes through the optical axis and is parallel to the tangential direction of the disc 7, is different from that on the right side of the straight line by π, the intensity becomes zero on the boundary between the right region and the left region in each of the focused spots 14*f* and 14*g* of the sub-beams. Thus, on the right and left sides of the center line of the track 13, two peaks that are equal to each other in intensity appear.

As described in Japanese Patent Laid-Open Publication No. Hei 9-81942, as for the tracking error signal obtained by a differential push-pull method, to shift the phase of the sub-beam on the left side with respect to the straight line, which passes through the optical axis and is parallel to the tangential direction of the disc 7, from that on the right side with respect to the straight line by π by shifting the phases of the gratings in the regions 12*e* and 12*f* in the diffractive optical element 3*c* from each other by π has equivalent effects to those achieved by arranging the focused spot of the main beam away from the focused spots of the sub-beams by one track pitch in the radial direction on the disc 7. Moreover, since three focused spots are located on the same track in this optical head device, relative positions of the focused spots with respect to the track 13 do not depend on the track pitch. Thus, this optical head device can accommodate a plurality of types of optical recording media each having a different track pitch.

The structure of the light-receiving portions of the photodetector 10 and the arrangement of the light spots on the photodetector 10 in this conventional optical head device are the same as those shown in FIG. 8. Please note that light spots 16*a*, 16*d*, and 16*e* are spots of zero-th order light, plus first order diffracted light, and minus first order diffracted light from the diffractive optical element 3*c*, respectively. In this optical head device, focusing error signals of the main beam and sub-beams by an astigmatism method and a focusing error signal by a differential astigmatism method are calculated by the expressions 1 to 3 described above.

In addition, the inventors of the present invention developed and disclosed a technique for correctly detecting a tilt of an optical recording medium in its radial direction (radial tilt) by dividing a diffractive optical element into a plurality of regions in the optical head device (see Japanese Patent Laid-Open Publication No. 2001-307358). This technique can detect the radial tilt correctly even if an objective lens moves in the radial direction of the optical recording medium. According to this technique, even if the objective lens moves in the radial direction of the optical recording medium, no offset is generated in a radial tilt signal and therefore the radial tilt can be correctly detected.

However, the aforementioned conventional optical head device has the following problems. FIGS. 12(*a*) through (*c*) are graphs showing exemplary various focusing error signals that were calculated, in each of which the horizontal axis represents the defocus amount of the disc 7 and the vertical axis represents the level of the focusing error signal normalized with a sum signal. FIG. 12(*a*) shows the focusing error signal of the main beam calculated by the above-mentioned expression 1; FIG. 12(*b*) shows the focusing error signal of the sub-beam calculated by the above-mentioned expression 2; and FIG. 12(*c*) shows the focusing error signal by a differential astigmatism method calculated by the above-mentioned expression 3. Moreover, in each graph, a black circle (●) represents the focusing error signal when the focused spot of the main beam is located on the land while a white circle (○) represents the focusing error signal when the focused spot of the main beam is located on the groove. Please note that the calculation condition that was set in this calculation is the same as that in the calculation of the focusing error signals shown in FIGS. 9(*a*) through (*c*).

As shown in FIG. 12(*a*), in a case of detecting the focusing error signal by a simple astigmatism method using the main beam only, the defocus-amount dependency of the focusing error signal when the focused spot of the main beam is located on the land is different from that when the focused spot of the main beam is located on the groove. Thus, the groove-crossing noise is generated. Moreover, in a case of detecting the focusing error signal by a differential astigmatism method using the main beam and sub-beams, as shown in FIG. 12(c), the defocus-amount dependency of the focusing error signal when the focused spot of the main beam is located on the land is coincident with that when the focused spot of the main beam is located on the groove around the origin. However, they are different from each other in a region other than a region around the origin. Thus, generation of the groove-crossing noise cannot be sufficiently suppressed. Especially, in a region from −1.5 μm to +1.5 μm in which the defocus amount actually fluctuates, the levels of the focusing signal on the land and that on the groove are different from each other. This is because the defocus-amount dependency of the focusing error signal of the main beam shown in FIG. 12(a) on the land and groove is not opposite to the defocus-amount dependency of the focusing error signal of the sub-beam shown in FIG. 12(b) on the land and groove in the region other than the region around the origin. Therefore, even if they are added, the difference of the defocus-amount dependency on the land and groove between the main beam and the sub-beams cannot be canceled out sufficiently.

As described above, as for a tracking error signal by a differential push-pull method, the conventional optical head device described in Japanese Patent Laid-Open Publication No. Hei 9-81942 has an effect that it is possible to obtain the correct tracking error signal that does not depend on the track pitch. However, this conventional optical head device does not have a sufficient effect as for a focusing error signal by a differential astigmatism method.

Moreover, in the optical head device described in Japanese Patent Laid-Open Publication No. 2001-307358, as for the radial tilt signal, correct signal detection can be achieved even when the objective lens shifts. However, this optical head device does not consider a focusing error signal by a differential astigmatism method and cannot achieve a sufficient effect as for the focusing error signal like the optical head device described in Japanese Patent Laid-Open Publication No. Hei 9-81942.

DISCLOSURE OF THE INVENTION

It is an object of the present invention to overcome the aforementioned problems of the conventional optical head devices and to provide an optical head device and an optical information recording or reproducing apparatus that can obtain a favorable focusing error signal with a groove-crossing noise sufficiently suppressed by a differential astigmatism method for a plurality of types of optical recording media each having a different track pitch.

An optical head device according to the present invention comprises: a light source; a diffractive optical element for diffracting light emitted from the light source to split the light into a main beam and sub-beams; an objective lens for focusing the main beam and the sub-beams onto an optical recording medium; astigmatism generation unit for providing astigmatism to light reflected from the optical recording medium; and a photodetector for receiving light transmitted through the astigmatism generation unit to receive the main beam and the sub-beams, and the diffractive optical element is divided into first, second, third, and fourth regions by a first straight line that crosses an optical axis of the light and extends in an extending direction of a grating of the diffractive optical element and a second straight line that crosses the optical axis and is perpendicular to the first line, a phase of the grating in the first region and the second region located diagonally with respect to the first region is different from a phase of the grating in the third region and the fourth region that are adjacent to the first and second regions and are located diagonally by substantially π, wherein the main beam and the sub-beams are focused in a region containing the same track on the optical recording medium.

In the present invention, the light emitted from the light source is split into the main beam and the sub-beams by the diffractive optical element, is focused onto the optical recording medium via the objective lens and is then reflected by the optical recording medium, and is then received by the photodetector after being provided with astigmatism by the astigmatism generation unit. In this case, the main beam and the sub-beams are focused in the region containing the same track on the optical recording medium, and the diffractive optical element is divided into four regions in which the phase of the grating in the first and second regions located diagonally is different from the phase of the grating in the third and fourth regions located diagonally by approximately π. Thus, the intensity in the focused spot of the sub-beam formed on the optical recording medium is zero in a region corresponding to a boundary of the adjacent regions of the diffractive optical element and has four peaks in regions corresponding to the first, second, third, and fourth regions. Therefore, dependency of a sum of a focusing error signal of the main beam and a focusing-error signal of the sub-beams, which are obtained by an astigmatism method, on the defocus amount of the optical recording medium in a case where the focused spots are located on a land is approximately equal to that in a case where the focused spots are located on a groove, thus suppressing a groove-crossing noise of the focusing error signal. As a result, a focusing-servo operation can be performed stably and therefore recording and reproduction can be performed with high precision. Moreover, by locating the focused spot of the main beam and the focused spots of the sub-beams in the region containing the same track, the optical head device of the present invention can accommodate a plurality of types of optical recording media each having a different track pitch.

In the present invention, it is preferable that the light source be a semiconductor laser. Thus, it is possible not only to precisely perform recording and reproduction but also to reduce the size of the light source and improve durability thereof.

In addition, it is preferable that the optical head device of the present invention include: a beam splitter for allowing at least a part of light incident thereon from the diffractive optical element to exit toward the objective lens and for allowing at least a part of light incident thereon from the objective lens after being reflected from the optical recording medium to exit toward the astigmatism generation unit, the beam splitter being a polarization beam splitter that transmits P-polarized light and reflects S-polarized light; and a quarter-wave plate provided between the polarization beam splitter and the objective lens. In this case, light transmitted through the polarization beam splitter as P-polarized light while traveling toward the optical recording medium is incident on the polarization beam splitter as S-polarized light when returning from the optical recording medium, by passing through the quarter-wave plate twice. Then, the light is reflected by the polarization beam splitter. As a result, an optical system of the optical head device can be simplified. It is also possible to reduce loss of light when the beam splitter makes the light incident from the diffractive optical element exit toward the objective lens and loss of light when the beam splitter makes the light incident from the objective lens exit toward the astigmatism generation unit.

An optical information recording or reproducing apparatus according to the present invention comprises: the aforementioned optical head device; an error signal generation circuit for generating focusing error signals of the main beam and the sub-beams by an astigmatism method based on a detection signal of the photodetector and outputting a sum of the focusing error signals of the main beam and the sub-beams as a focusing error signal for a focusing-servo operation; and an objective lens driving unit for controlling a position of the objective lens based on the focusing error signal for the focusing-servo operation.

It is preferable that the error signal generation circuit generate tracking error signals of the main beam and the sub-beams by a push-pull method based on the detection signal of the photodetector and further output a difference between the tracking error signal of the main beam and the tracking error signal of the sub-beams as a tracking error signal for a tracking-servo operation, and the objective lens driving unit further control the position of the objective lens based on the tracking error signal for the tracking-servo operation.

According to the present invention, by locating the focused spots of the main beam and the sub-beams in the region containing the same track, it is possible to perform recording and reproduction of data for a plurality of types of optical recording media each having a different track pitch. Moreover, since the focusing error signal on the land and the focusing error signal on the groove are approximately coincident with each other, a favorable focusing error signal with a groove-crossing noise sufficiently suppressed can be obtained by a differential astigmatism method. Thus, it is possible to stabilize the focusing-servo operation and therefore recording and reproduction can be performed with high precision.

BRIEF DESCRIPTION OF THE DRAWINGS

FIG. 4(a) shows a focusing error signal of a main beam; FIG. 4(b) shows a focusing error signal of sub-beams; and FIG. 4(c) shows a focusing error signal by a differential astigmatism method.

FIG. 9(a) shows a focusing error signal of a main beam; FIG. 9(b) shows a focusing error signal of sub-beams; and FIG. 9(c) shows a focusing error signal by a differential astigmatism method.

FIG. 12(a) shows a focusing error signal of a main beam; FIG. 12(b) shows a focusing error signal of sub-beams; and FIG. 12(c) shows a focusing error signal by a differential astigmatism method.

BEST MODE FOR CARRYING OUT THE INVENTION

The inventors of the present invention considered that, in order to solve the aforementioned problems, it is necessary that a focused spot of a main beam and focused spots of sub-beams formed on a disc by an optical head device are located on the same track, and dependency of a focusing error signal on the defocus amount in a case where the focused spots are located on a land is equal to that in a case where the focused spots are located on a groove. The inventors then made experiments and researches so as to find a condition for achieving the above, and found that the aforementioned condition could be satisfied by dividing a diffractive optical element into four regions in the form of a 2×2 matrix and shifting phases of diffraction gratings in two regions arranged diagonally from that in the other two regions by π so as to form four peaks in focused spots of sub-beams. As a result of this finding, the present invention has been completed.

Figure 1:
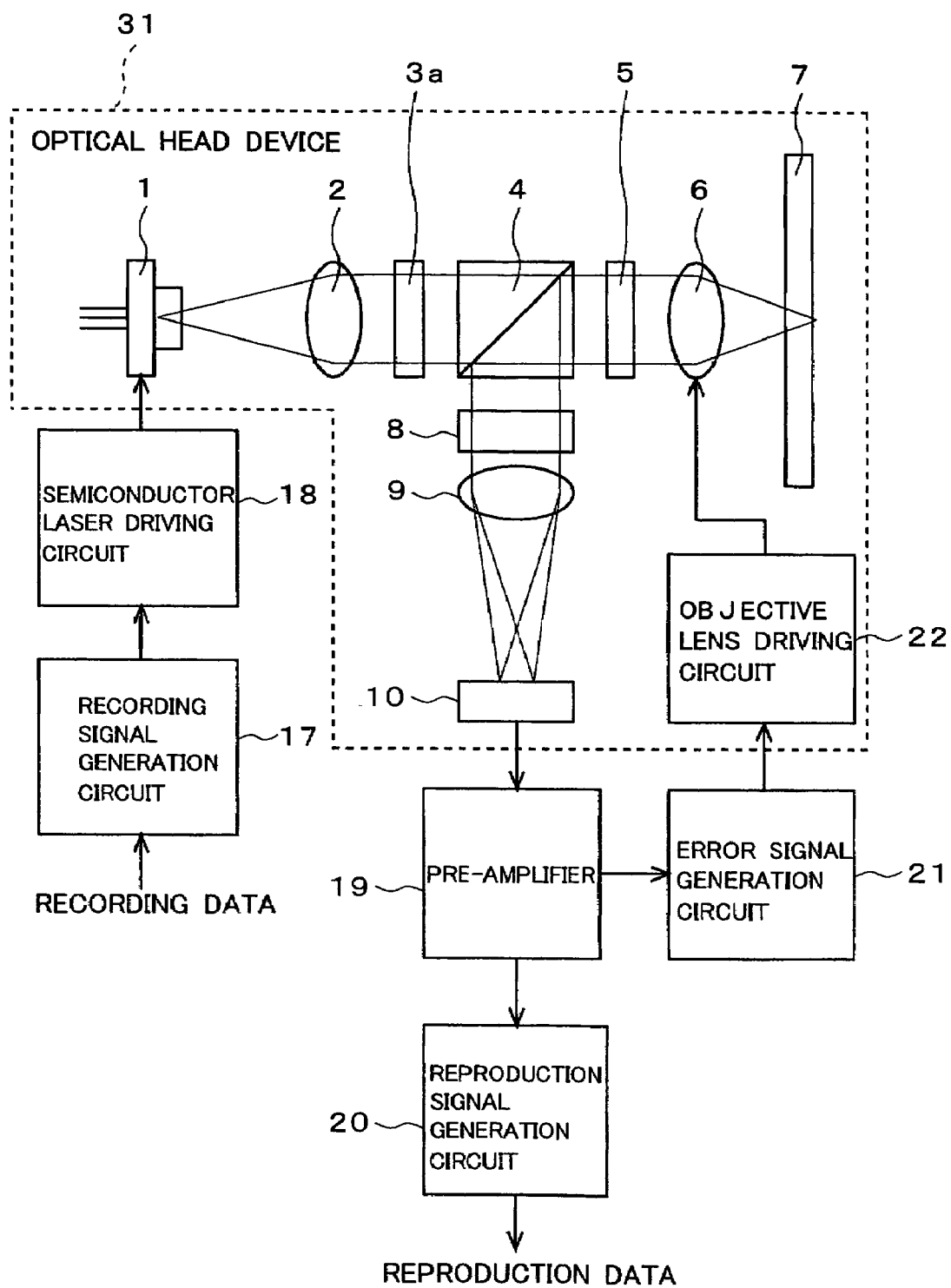
FIG. 1 is a block diagram of an optical information recording or reproducing apparatus according to an embodiment of the present invention.
Figure 2:
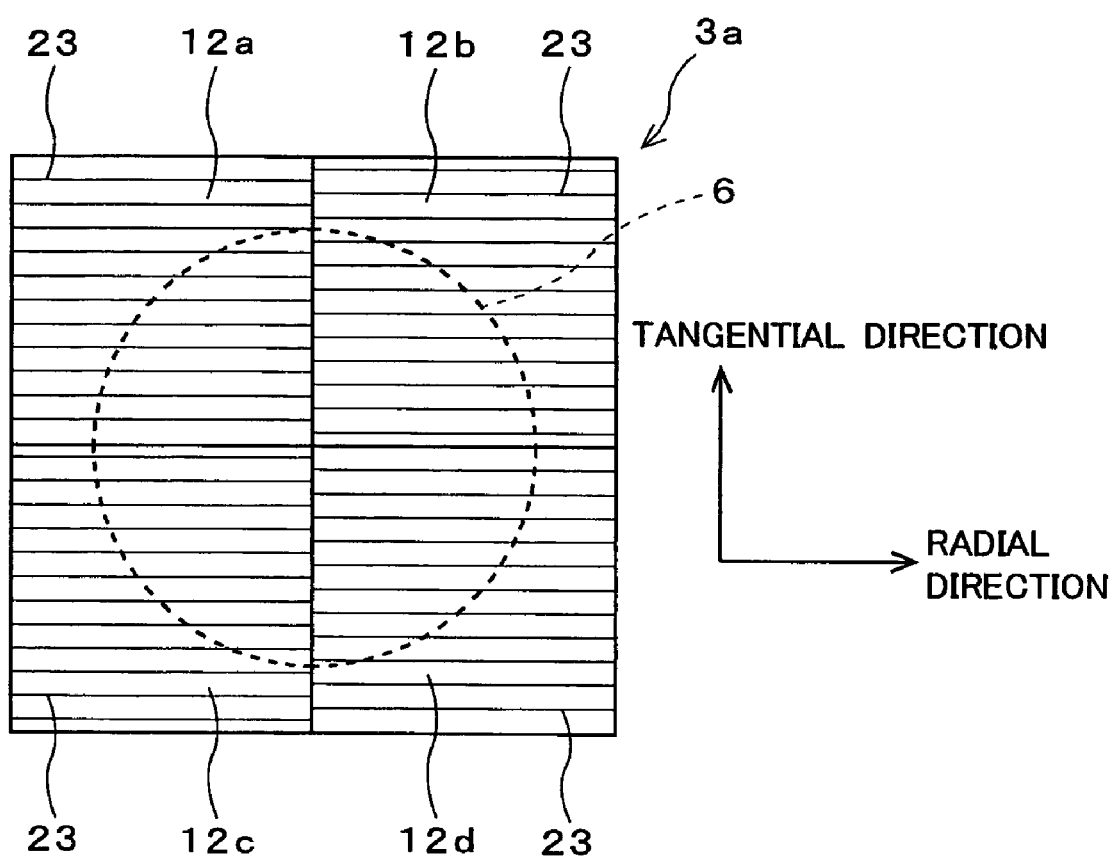
FIG. 2 is plan view of a diffractive optical element shown in FIG. 1.

Hereinafter, an embodiment of the present invention will be specifically described with reference to the accompanying drawings. FIG. 1 is a block diagram of an optical information recording or reproducing apparatus according to the present embodiment, and FIG. 2 is a plan view of a diffractive optical element shown in FIG. 1. The optical information recording or reproducing apparatus of the present embodiment is a DVD (Digital Versatile Disc) drive, for example. As shown in FIG. 1, an optical head device 31 is incorporated into the optical information recording or reproducing apparatus of this embodiment. In the optical head device 31, a semiconductor laser 1 is provided, and along a traveling path of laser light emitted from this semiconductor laser 1, a collimator lens 2 for collimating the laser light emitted from the semiconductor laser 1, a diffractive optical element 3a for diffracting light incident thereon, a polarization beam splitter 4 for transmitting P-polarized light and reflecting S-polarized light toward a predetermined direction, a quarter-wave plate 5 for, when linearly polarized light beams that vibrate in directions perpendicular to each other are incident thereon, providing a phase difference of a ¼ wavelength to those linearly polarized light beams, and an objective lens 6 for converging collimated light incident thereon are provided in that order.

A disc 7 that is an exemplary optical recording medium is arranged at a focus of the objective lens 6. Please note that a direction perpendicular to the sheet of FIG. 1 is a tangential direction at a position on the disc 7 that is irradiated with laser light, while a vertical direction in the same drawing is a radial direction at the position on the disc 7 irradiated with the laser light.

Figure 8:
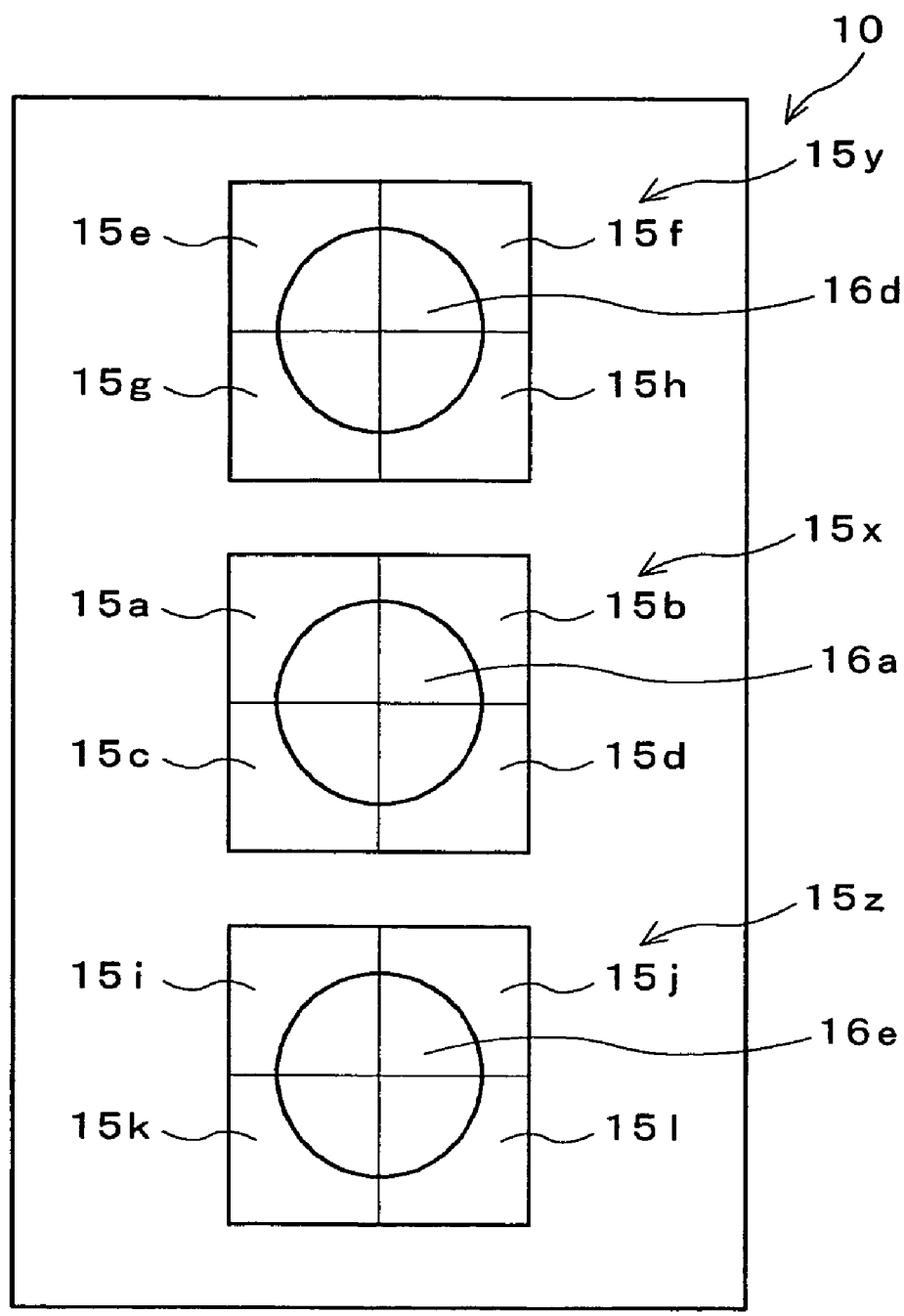
FIG. 8 is a plan view showing a light-receiving portion of a photodetector and positions of light spots on the photodetector.

Along a traveling path of light reflected from the polarization beam splitter 4, a cylindrical lens 8, a lens 9, and a photodetector 10 are arranged. The cylindrical lens 8 and the lens 9 constitute astigmatism generation unit for providing astigmatism to light. The photodetector 10 is arranged midway between two focal lines formed by a composite lens formed by the cylindrical lens 8 and the lens 9. The astigmatism generation unit can be formed by a lens and a plane parallel plate that is placed at a predetermined angle with respect to an optical axis of incident light, in place of the cylindrical lens and the lens. The structure of the photodetector 10 is the same as the photodetector of the conventional optical head device shown in FIG. 8. Please note that light spots 16a, 16d, and 16e are spots of zero-th order light, plus first order diffracted light, and minus first order diffracted light from the diffractive optical element 3a, respectively.

Moreover, as shown in FIG. 2, the diffractive optical element 3a is square and is divided into four square regions 12a, 12b, 12c, and 12d by a straight line passing thorough the optical axis of the incident light and extending along the tangential direction of the disc 7 and a straight line passing through the optical axis of the incident light and extending along the radial direction. In each of the divided regions, a diffraction grating 23 is formed. That is, the regions 12a through 12d are arranged in a 2×2 matrix. The region 12a is adjacent to the regions 12b and 12c and is diagonal with respect to the region 12d. The pattern of the diffraction grating 23 is formed by straight lines arranged at equal pitches. The diffraction grating 23 extends along the radial direction of the disc 7. The phase of the grating in the region 12a is equal to that of the grating in the region 12d, and the phase of the grating in the region 12b is equal to that of the grating in the region 12c. However, the phase of the gratings in the regions 12a and 12d is shifted from that of the gratings in the regions 12b and 12c by $\pi$ (corresponding to a half pitch). Thus, the phase of plus first order diffracted light from the regions 12a and 12d is shifted from that of the plus first order diffracted light from the regions 12b and 12c by $\pi$, while the phase of minus first order diffracted light from the regions 12a and 12d is shifted from the phase of minus first order diffracted light from the regions 12b and 12c by $\pi$. Please note that a circle shown with broken line in FIG. 2 represents an effective region of the objective lens 6.

In addition, as shown in FIG. 1, a recording signal generation circuit 17 is provided outside the optical head device 31 in the optical information recording or reproducing apparatus of the present embodiment. The recording signal generation circuit 17 generates a recording signal for driving the semiconductor laser 1 based on recording data externally input. Moreover, a semiconductor laser driving circuit 18 is also provided to which the recording signal output from the recording signal generation circuit 17 is input and which generates a driving signal for driving the semiconductor laser 1 based on the thus input recording signal and outputs the driving signal to the semiconductor laser 1.

Furthermore, a pre-amplifier 19 is provided for converting a current signal output from the photodetector 10 into a voltage signal, and a reproduction signal generation circuit 20 is also provided for generating a reproduction signal based on the voltage signal output from the pre-amplifier 19 and outputting reproduction data to the outside. In addition, the optical information recording or reproducing apparatus of the present embodiment includes: an error signal generation circuit 21 for generating a focusing error signal and a tracking error signal for driving the objective lens 6 based on the voltage signal output from the pre-amplifier 19; an objective lens driving circuit 22, to which the focusing error signal and the tracking error signal are input, for generating a driving signal based on the thus input signals; and an actuator (not shown) to which the driving signal output from the objective lens driving circuit 22 is input and which controls the position of the objective lens 6. The objective lens driving circuit 22 and the actuator constitute together objective lens driving unit. The optical information recording or reproducing apparatus of the present embodiment further includes a spindle control circuit for rotating the disc 7, a positioner control circuit for moving the entire optical head device 31 with respect to the disc 7, and the like.

Next, an operation of the optical information recording or reproducing apparatus of the present embodiment having the structure mentioned above will be described. First, a recording operation for the disc 7 will be described. As shown in FIG. 1, recording data is input from the outside to the recording signal generation circuit 17. Based on the input recording data, the recording signal generation circuit 17 generates a recording signal for driving the semiconductor laser 1 and outputs it to the semiconductor laser driving circuit 18. Next, the semiconductor laser driving circuit 18 generates a driving signal based on the recording signal and outputs the driving signal to the semiconductor laser 1 of the optical head device 31.

And, based on the input driving signal, the semiconductor laser 1 emits laser light. This laser light is collimated by the collimator lens 2 and divided into three, i.e., zero-th order light as a main beam and plus and minus first order diffracted light as sub-beams by the diffractive optical element 3a. These light beams are incident on the polarization beam splitter 4 as P-polarized light and are transmitted by the polarization beam splitter 4 approximately completely, and are then converted from linearly polarized light to circularly polarized light when passing through the quarter-wave plate 5, and are finally focused onto the disc 7 by the objective lens 6. In this manner, data is written on the disc 7 and a signal is recorded on the disc 7.

Figure 3:
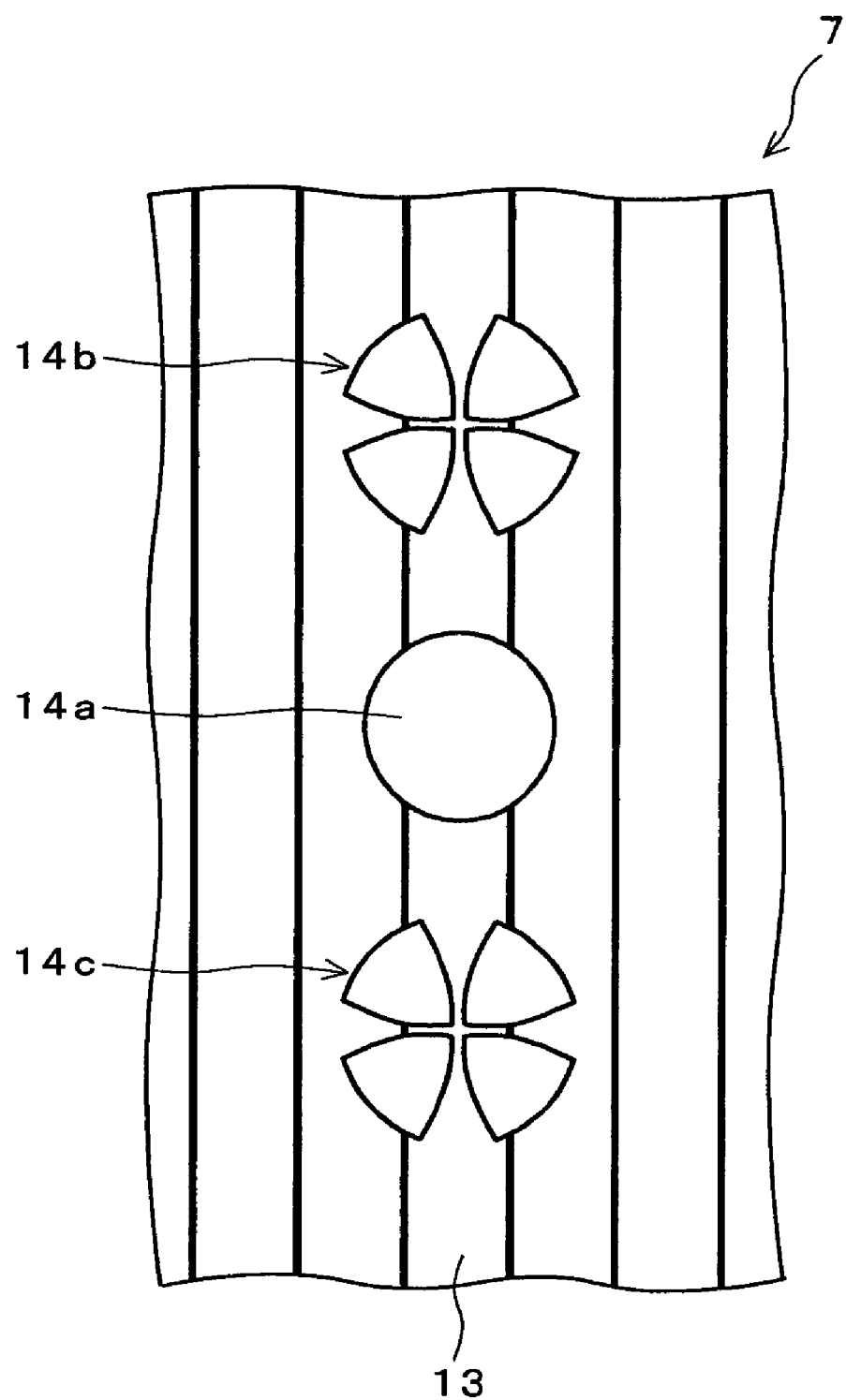
FIG. 3 is a plan view showing positions of focused spots on a disc shown in FIG. 1.

FIG. 3 is a plan view showing positions of focused spots on the disc 7 shown in FIG. 1. Focused spots 14a, 14b, and 14c shown in FIG. 3 are spots of zero-th order light, plus first order diffracted light, and minus first order diffracted light from the diffractive optical element 3a, respectively. These three focused spots are located in a region including the same track 13. The track 13 is a land or a groove. On the basis of a straight line that passes through the optical axis and is parallel to the tangential direction of the disc 7 and a straight line that passes through the optical axis and is parallel to the radial direction as references, in the sub-beam, the phase in the upper left and lower right regions and the phase in the upper right and lower left regions in FIG. 3 are different from each other by $\pi$. As a result, on the basis of that straight lines passing through the center of each focused spot and extending in the tangential direction and the radial direction, respectively, as references, in each of the focused spots 14b and 14c of the sub-beams, four peaks that are equal in intensity appear in the upper left, upper right, lower left and lower right regions, respectively.

These three beams are reflected from the disc 7, are transmitted by the objective lens 6 in the reverse direction, and are then converted from circularly polarized light into linearly polarized light having a polarization direction perpendicular to that of the light traveling toward the disc 7, when passing through the quarter-wave plate 5. Then, the linearly polarized light is incident on the polarization beam splitter 4 as S-polarized light and is reflected by the polarization beam splitter 4 approximately completely, thereby being directed toward the cylindrical lens 8. This light is provided with astigmatism by passing through the cylindrical lens 8 and the lens 9 and is then incident on the photodetector 10. Each of the light-receiving portions 15a–15l of the photodetector 10 generates a current signal based on the intensity of received light and outputs the signal to the pre-amplifier 19. Since the light with astigmatism is incident on the photodetector 10, the intensity of the light received by each of the light-receiving portions 15a through 15l varies in accordance with the shift amount of the disc 7 from the focus position, i.e., the defocus amount.

Then, as shown in FIG. 1, the pre-amplifier 19 converts the current signal input thereto into a voltage signal, and outputs the voltage signal to the reproduction signal generation circuit 20 and the error signal generation circuit 21. The error signal generation circuit 21 then generates a focusing error signal and a tracking error signal for driving the objective lens 6 based on the voltage signal input from the pre-amplifier 19. In this generation of the error signals, the focusing error signals of the main beam and the sub-beams by an astigmatism method and the focusing error signal by a differential astigmatism method can be obtained by the expressions 1 to 3 described above.

The tracking error signal TEM of the main beam by a push-pull method is obtained by performing calculation in accordance with the expression 4.

$$TEM = (V15a + V15b) - (V15c + V15d) \qquad (4)$$

The tracking error signal TES of the sub-beam by a push-pull method is obtained by performing calculation in accordance with the expression 5.

$$TES = (V15e + V15f + V15i + V15j) - (V15g + V15h + V15k + V15l) \qquad (5)$$

Moreover, the tracking error signal TE by a differential push-pull method is obtained by the expression 6, where a ratio of the light amount of the main beam to the sub-beams is K.

$$TE = TEM - K \times TES \qquad (6)$$

Then, the objective lens driving circuit 22 drives the actuator based on the focusing error signal and the tracking error signal that are input from the error signal generation circuit 21, thereby controlling the position of the objective lens 6. In this manner, a focusing-servo operation and a tracking-servo operation are performed.

Next, reproduction operation from the disc 7 will be described. In reproduction of data, the semiconductor laser driving circuit 18 does not drive the semiconductor laser 1 based on the recording data externally input, but causes the semiconductor laser 1 to emit laser light with a constant output. Then, by performing a similar operation to the aforementioned recording operation, laser light is focused onto the disc 7 and is reflected from the disc 7, so that the reflected light is picked up as a current signal by the photodetector 10. The pre-amplifier 19 converts this current signal into a voltage signal, and outputs the voltage signal to the reproduction signal generation circuit 20 and the error signal generation circuit 21.

Then, the reproduction signal generation circuit 20 generates a reproduction signal based on the voltage signal input from the pre-amplifier 19. The reproduction signal D of the main beam is obtained by calculation in accordance with the expression 7.

$$D = V15a + V15b + V15c + V15d \qquad (7)$$

The reproduction signal generation circuit 20 then outputs the thus obtained reproduction signal D to the outside as reproduction data. In this manner, reproduction of a signal from the disc 7 is performed. It should be noted that the operations of the error signal generation circuit 21, the objective lens driving circuit 22, and the actuator are the same as those in the data recording.

In the present embodiment, it is possible to accommodate a plurality of types of optical recording media each having a different track pitch because three focused spots are located on the same track. Moreover, in the present embodiment, the following advantageous effects can be obtained by providing the diffractive optical element 3a (see FIG. 2). First, among laser light collimated by the collimator lens 2, the main beam and the sub-beams that have been transmitted through or diffracted by the regions 12a and 12b of the diffractive optical element 3a are considered. As described in Japanese Patent Laid-Open Publication No. Hei 9-81942, as for the tracking error signal by a differential push-pull method, to shift the phase of the sub-beam on the left region with respect to the straight line, which passes through the optical axis and is parallel to the tangential direction of the disc 7, from that on the right region with respect to the straight line by π by shifting the phases of the gratings in the regions 12a and 12b in the diffractive optical element 3a from each other by π has equivalent effects to those achieved by arranging the focused spot of the main beam away from the focused spots of the sub-beams by one track pitch in the radial direction on the disc 7. Similarly, among the laser light collimated by the collimator lens 2, the main beam and the sub-beams that have been transmitted through or diffracted by the regions 12c and 12d of the diffractive optical element 3a are considered. As for the tracking error signal by a differential push-pull method, to shift the phase of the sub-beam on the left region with respect to the straight line, which passes through the optical axis and is parallel to the tangential direction of the disc 7, from that on the right region with respect to the straight line by π by shifting the phases of the gratings in the regions 12c and 12d in the diffractive optical element 3a from each other by π has equivalent effects to those achieved by arranging the focused spot of the main beam away from the focused spots of the sub-beams by one track pitch in the radial direction on the disc 7.

Thus, when all the main beam and the sub-beams are considered, as for the tracking error signal by a differential push-pull method, to shift the phase of the sub-beam on the upper left and lower right regions with respect to the straight line which passes through the optical axis and extends in the tangential direction of the disc 7 and the straight line which passes through the optical axis and extends in the radial direction, from that on the upper right and lower left regions with respect to the straight lines by π by shifting the phase of the gratings in the regions 12a and 12d and that of the gratings in the regions 12b and 12c in the diffractive optical element 3a from each other by π has equivalent effects to those achieved by arranging the focused spot of the main beam away from the focused spots of the sub-beams by one track pitch in the radial direction on the disc 7.

Figure 4:
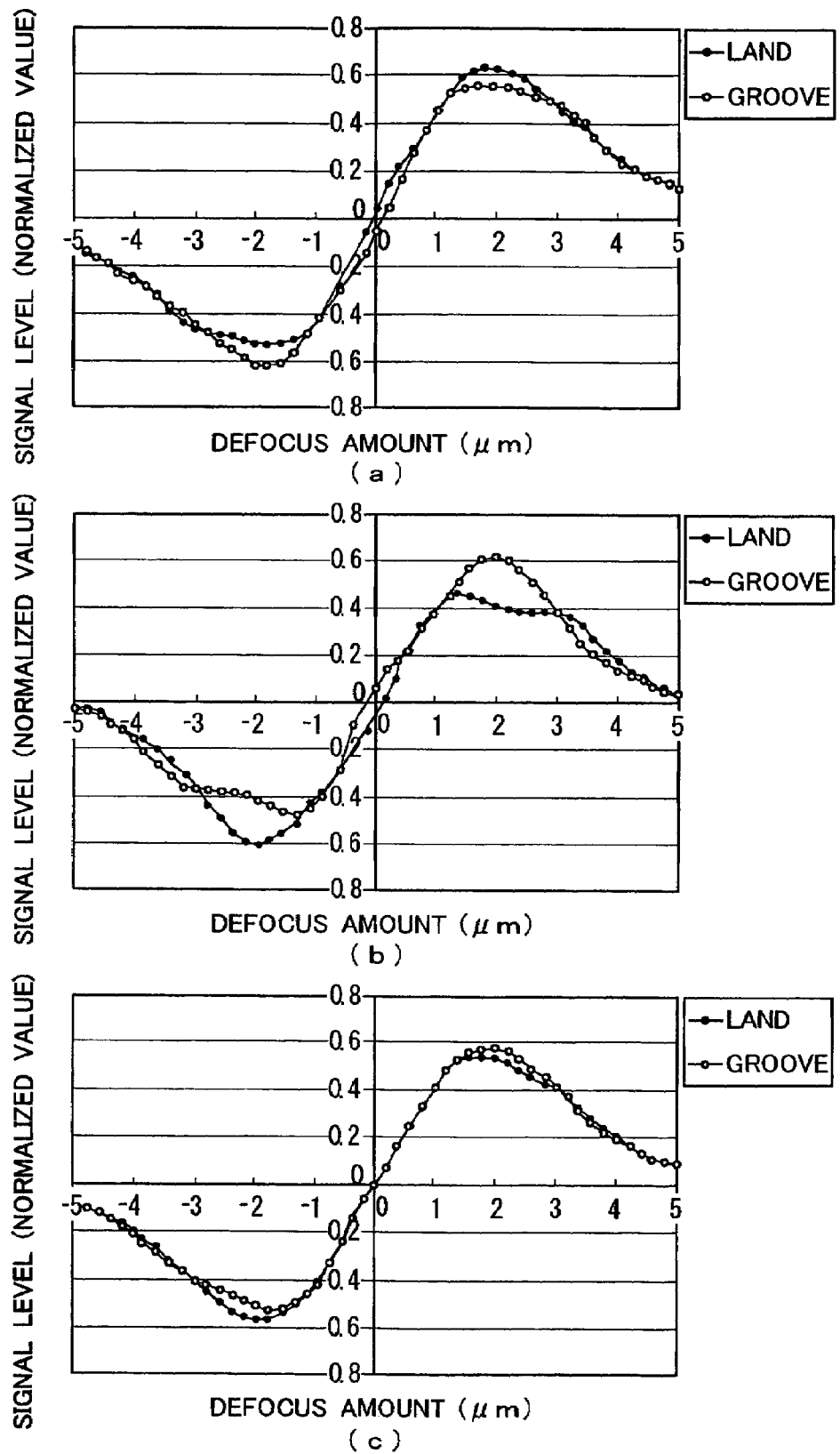
FIGS. 4(a) through (c) are graphs showing exemplary various focusing error signals that were calculated, in each of which the horizontal axis represents the defocus amount of the disc and the vertical axis represents the level of the focusing error signal normalized with a sum signal.
Figure 5:
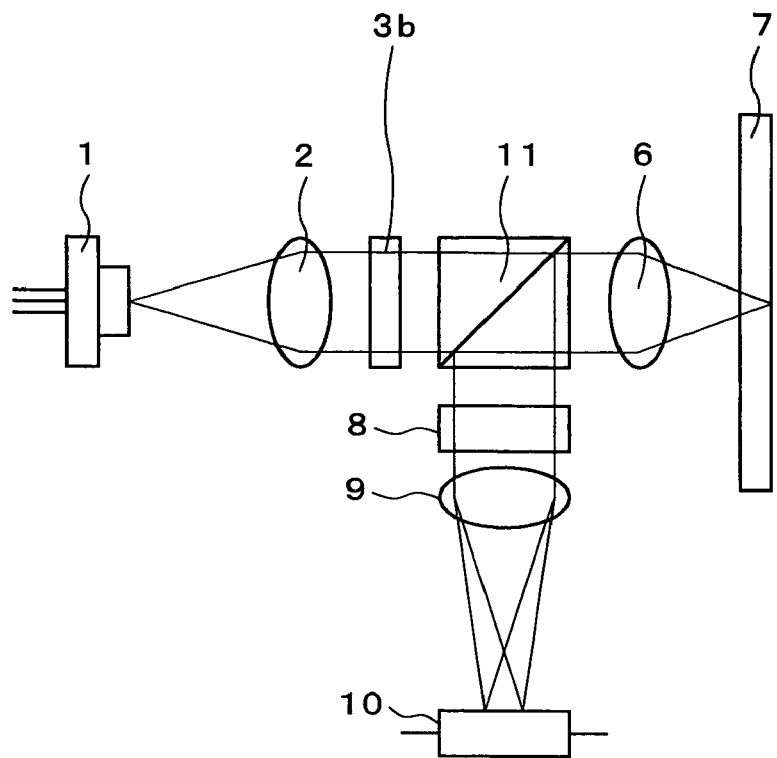
FIG. 5 is a block diagram of a conventional optical head device that detects a focusing error signal by a differential astigmatism method.
Figure 6:
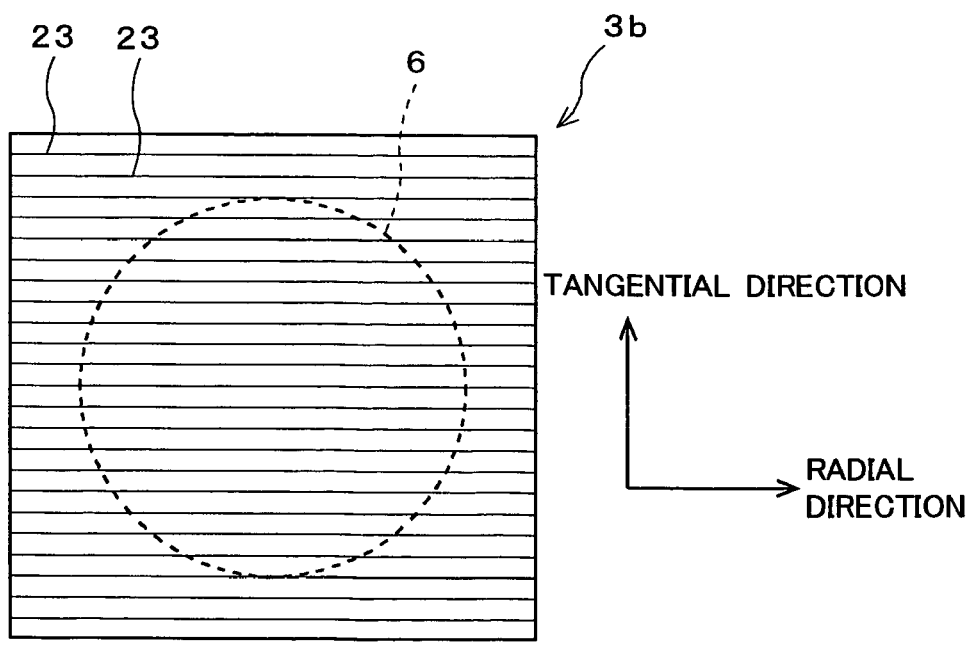
FIG. 6 is a plan view of a diffractive optical element in the conventional optical head device.
Figure 7:
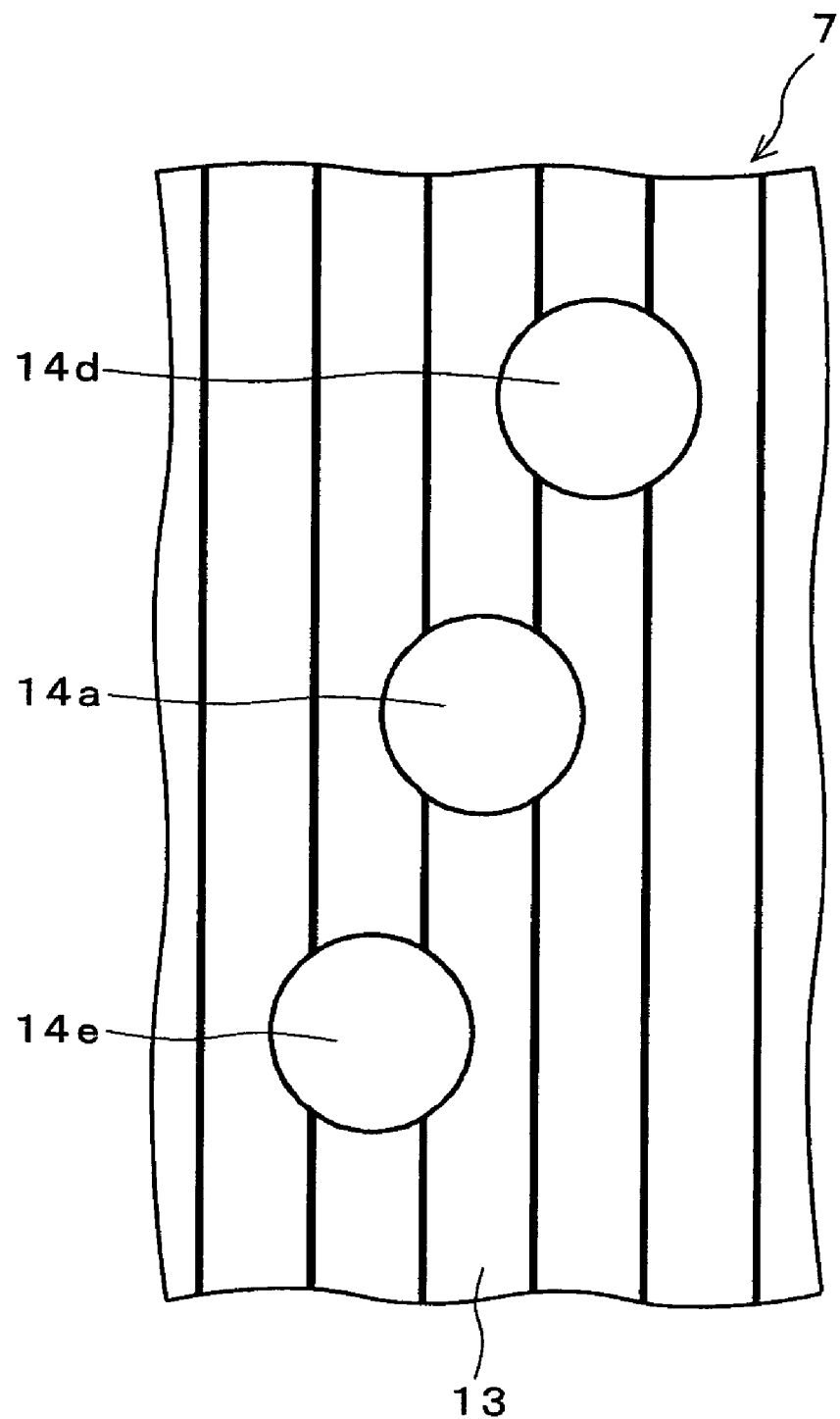
FIG. 7 is a plan view showing positions of focused spots on a disc in the conventional optical head device.
Figure 9:
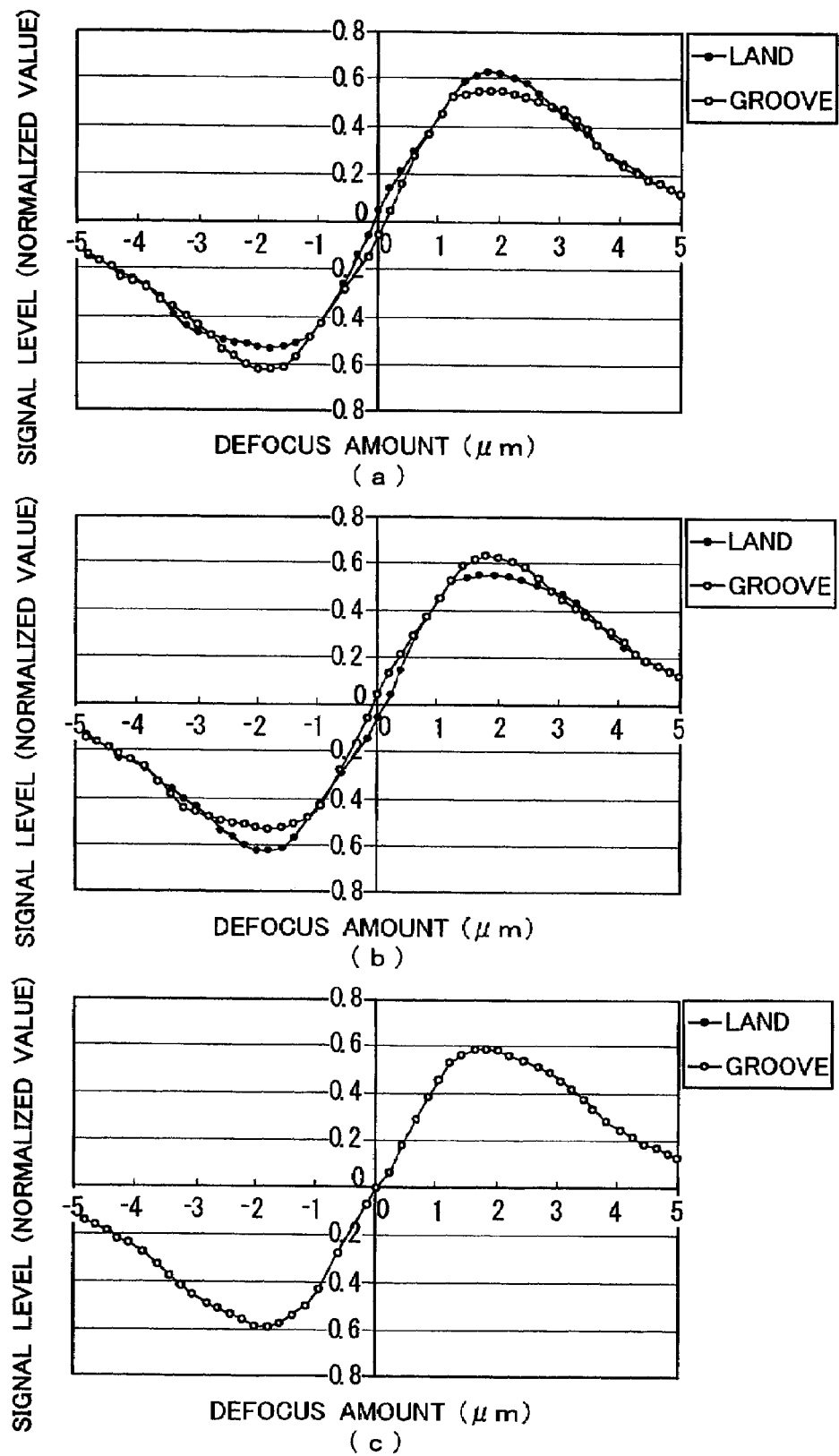
FIGS. 9(a) through (c) are graphs showing exemplary various focusing error signals that were calculated, in each of which the horizontal axis represents the defocus amount of the disc and the vertical axis represents the level of the focusing error signal normalized with a sum signal.
Figure 10:
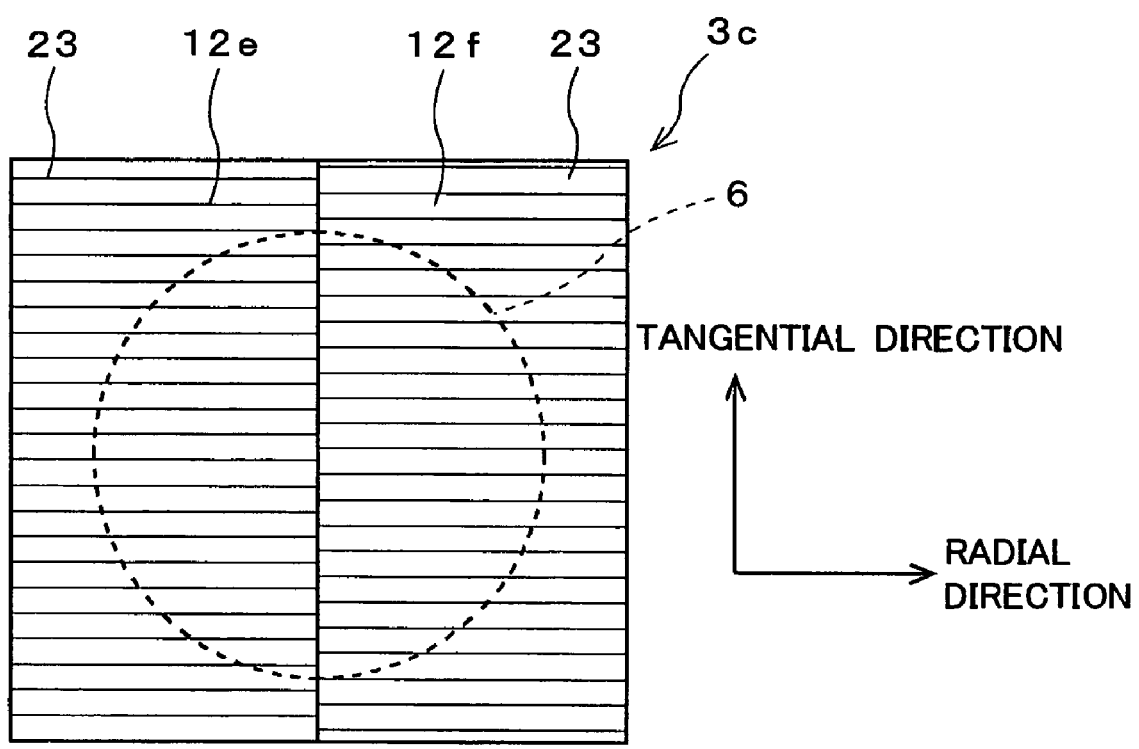
FIG. 10 is a plan view of a diffractive optical element in a conventional optical head device.
Figure 11:
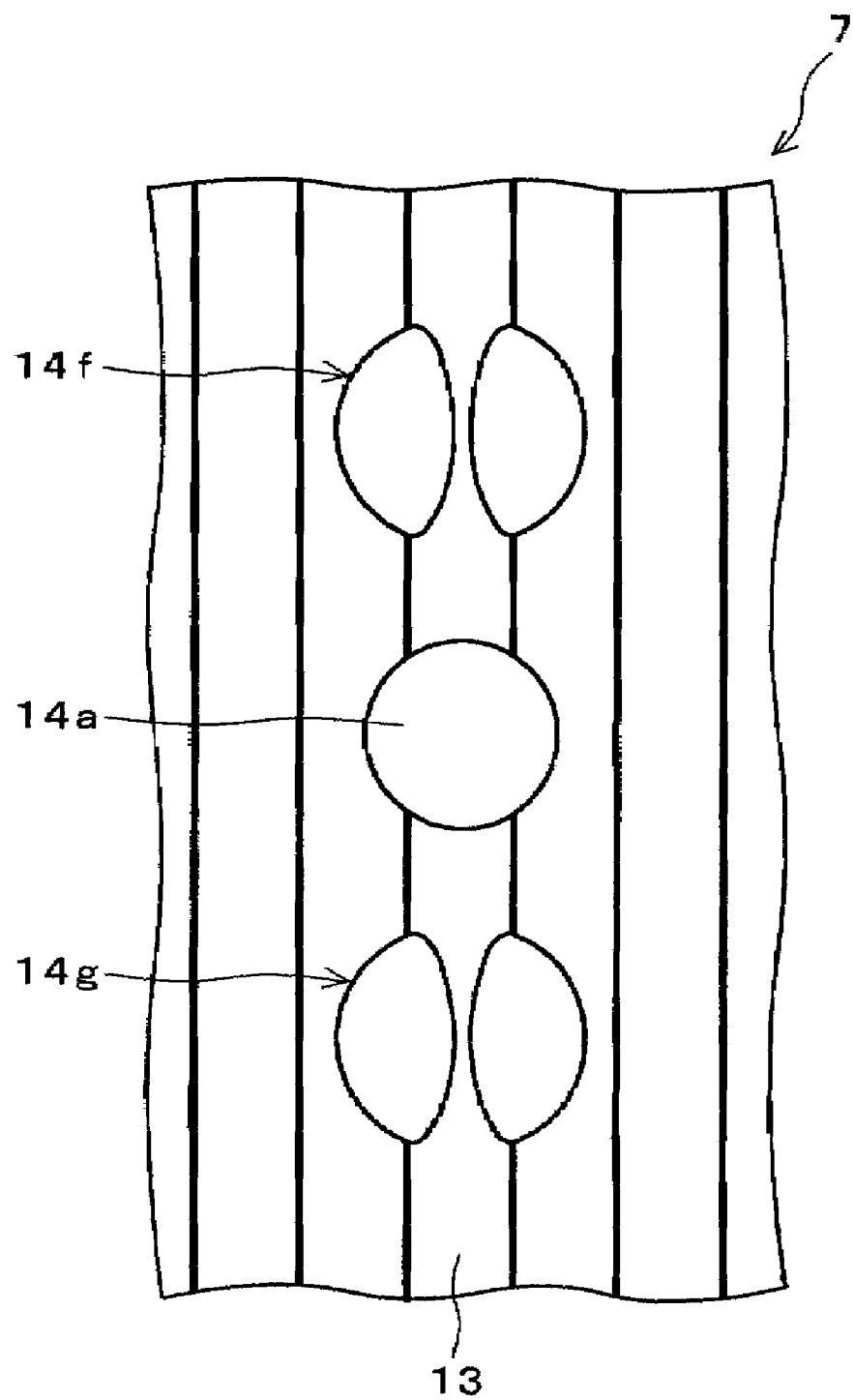
FIG. 11 is a plan view showing positions of focused spots on a disc in this conventional optical head device.
Figure 12:
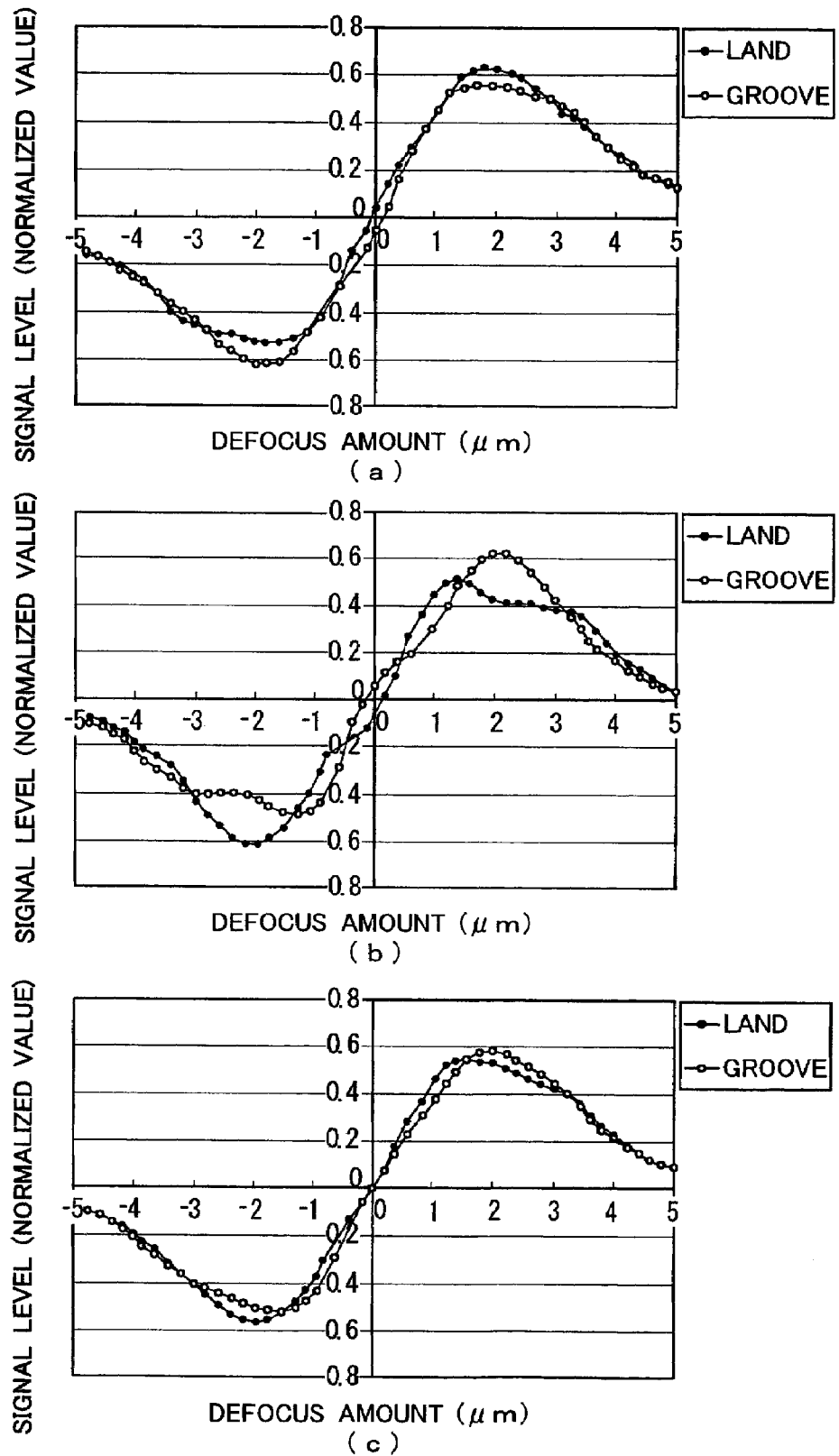
FIGS. 12(a) through (c) are graphs showing exemplary various focusing error signals that were calculated, in each of which the horizontal axis represents the defocus amount of the disc and the vertical axis represents the level of the focusing error signal normalized with a sum signal.

Moreover, in the present embodiment, even if the focused spot formed on the disc 7 by the optical head device 31 crosses the land and the groove, generation of a groove-crossing noise can be suppressed. This advantageous effect will be described below. FIGS. 4(a) through (c) are graphs of exemplary various focusing error signals that were calculated, in each of which the horizontal axis represents the defocus amount of the disc 7 and the vertical axis represents the level of the focusing error signal normalized with a sum signal. FIG. 4(a) shows the focusing error signal of the main beam calculated by the above-mentioned expression 1; FIG. 4(b) shows the focusing error signal of the sub-beam calculated by the above-mentioned expression 2; and FIG. 4(c) shows the focusing error signal by a differential astigmatism method calculated by the above-mentioned expression 3. In each of FIGS. 4(a) through (c), a black circle (●) represents the focusing error signal when the focused spots are located on the land, while a white circle (○) represents the focusing error signal when the focused spots are located on the groove. The condition set in this calculation is the same as that set in the calculation shown in FIGS. 9(a) through (c).

As shown in FIG. 4(a), when the focusing error signal is detected by a simple astigmatism method using the main beam only, the defocus-amount dependency of the focusing error signal on the land is different from that on the groove. Thus, the groove-crossing noise is generated. On the other hand, as shown in FIG. 4(c), when the focusing error signal is detected by a differential astigmatism method using both the main beam and the sub-beams, the defocus-amount dependency of the focusing error signal on the land is approximately coincident with that on the groove in a range of the defocus amount from −1.5 μm to +1.5 μm. Thus, the groove-crossing noise can be sufficiently suppressed. This is because the defocus-amount dependency of the focusing error signal of the main beam shown in FIG. 4(a) and the defocus-amount dependency of the focusing error signal of the sub-beams shown in Fib. 4(b) are opposite to each other on the land and the groove in the range of the defocus amount from −1.5 μm to +1.5 μm and therefore the difference between them can be canceled out sufficiently by adding them.

As described above, in the present embodiment, for a plurality of types of optical recording media each having a different track pitch, a favorable focusing error signal with a groove-crossing noise sufficiently suppressed can be obtained by a differential astigmatism method. Moreover, for a plurality of types of optical recording media each having a different track pitch, a favorable tracking error signal with suppressed offset can be obtained by a differential push-pull method.

In addition, the quarter-wave plate 5 is provided between the polarization beam splitter 4 and the objective lens 6 in the optical head device 31 of the present embodiment. Thus, when light incident on the polarization beam splitter 4 from the collimator lens 2 is P-polarized light, this light passes through the quarter-wave plate 5 twice while traveling back and forth between the polarization beam splitter 4 and the disc 7 after transmitting the polarization beam splitter 4, and therefore enters the polarization beam splitter 4 from the objective lens 6 as S-polarized light. Since the polarization beam splitter 4 transmits P-polarized light but reflects S-polarized light, it allows the light incident thereon from the collimator lens 2 to exit toward the objective lens 6 with substantially no loss and also allows the light incident thereon from the objective lens 6 to exit toward the cylindrical lens 8 with substantially no loss.

In the present embodiment, the phase difference of the grating between the regions 12a and 12d of the diffractive optical device 3a and the regions 12b and 12c is set to π. However, it is not necessary that this phase difference is not set to π exactly, but it is sufficient that this phase difference is set to approximately π. The reason is as follows. The effect of suppressing the groove-crossing noise by a differential astigmatism method becomes the maximum when the phase difference is π. However, while the phase difference is around π, the change of the effect of suppressing the groove-crossing noise is small. Thus, even if the phase difference is slightly larger or smaller than π, the effect of suppressing the groove-crossing noise hardly changes.

Moreover, in the present embodiment, the focused spots 14a, 14b, and 14c are located on the same track 13. However, it is not necessary that these focused spots are located on exactly the same track. It is sufficient that they are located in a region containing the same track. The effect of suppressing the groove-crossing noise by a differential astigmatism method becomes the maximum when the focused spots are located on the same track. However, as long as the focused spots are located in the vicinity of the same track, the change of the effect of the suppressing the groove-crossing noise when the center of the focused spots moves away from the center line of the track is small. Therefore, even if the locations of the focused spots are slightly shifted from the same track, the effect of suppressing the groove-crossing noise hardly changes.

The optical information recording or reproducing apparatus of the present embodiment is a recording and reproducing apparatus for performing recording and reproduction for the disc 7. However, the present invention is not limited thereto. The present invention can be applied to a reproduction-only apparatus that only performs reproduction for the disc 7. In this case, the semiconductor laser 1 is not driven based on recording data externally input thereto, but emits laser light with an always constant output.

The optical information recording or reproducing apparatus of the present embodiment is not limited to a DVD drive, but may be a reproduction-only apparatus. The optical information recording or reproducing apparatus of the present invention may be a DVD-R (Digital Versatile Disc Recordable: recordable DVD) drive, a DVD-ROM (Digital Versatile Disc-Read Only Memory: read-only DVD) drive, a DVD-RW (Digital Versatile Disc ReWritable), or the like. Moreover, the optical information recording or reproducing apparatus of the present invention may be a CD-R (Compact Disc Recordable: recordable compact disc) drive, a CD-ROM (Compact Disc Read Only Memory: read-only compact disc) drive, or the like.

INDUSTRIAL APPLICABILITY

The present invention relates to an optical head device and an optical information recording or reproducing apparatus that performs recording and/or reproduction for an optical recording medium such as a DVD, DVD-R, DVD-ROM, DVD-RW, CD-R, CD-ROM, and the like.

The invention claimed is:

1. An optical head device comprising:
   a light source;
   a diffractive optical element for diffracting light emitted from said light source to split the light into a main beam and sub-beams, said diffractive optical element is divided into first, second, third, and fourth regions by a first straight line that crosses an optical axis of the light and extends in an extending direction of a grating of said diffractive optical element and a second straight line that crosses the optical axis and is perpendicular to said first line;

an objective lens for focusing said main beam and said sub-beams onto an optical recording medium;

an astigmatism generation unit for providing astigmatism to light reflected from said optical recording medium; and a photodetector for receiving light transmitted through said astigmatism generation unit to receive the main beam and the sub-beams, wherein a phase of the grating in said first region and said second region located diagonally with respect to said first region is different from a phase of the grating in said third region and said fourth region that are adjacent to said first and second regions and are located diagonally by substantially $\pi$, and the main beam and the sub-beams are focused in a region containing the same track on said optical recording medium.

2. The optical head device according to claim 1, wherein said optical recording medium is circular in shape, said first straight line is parallel to a tangential direction of a track in a region of said optical recording medium that is irradiated with light, and said second straight line is parallel to a radial direction in the region of said optical recording medium.

3. The optical head device according to claim 1, wherein said main beam is zero-th order light transmitted through said diffractive optical element, and said sub-beams are minus first order diffracted light and plus first order diffracted light that have been diffracted by said diffractive optical element.

4. The optical head device according to claim 1, wherein said light source is a semiconductor laser.

5. The optical head device according to claim 1, comprising a beam splitter for allowing at least a part of light incident thereon from said diffractive optical element to exit toward said objective lens and for allowing at least a part of light incident thereon from said objective lens after being reflected from said optical recording medium to exit toward said astigmatism generation unit.

6. The optical head device according to claim 5, wherein said beam splitter is a polarization beam splitter that transmits P-polarized light and reflects S-polarized light, and the optical head device further comprises a quarter-wave plate provided between said polarization beam splitter and said objective lens.

7. An optical information recording or reproducing apparatus comprising:

an optical head device comprising:

a light source;

a diffractive optical element for diffracting light emitted from said light source to split the light into a main beam and sub-beams, said diffractive optical element is divided into first, second, third, and fourth regions by a first straight line that crosses an optical axis of the light and extends in an extending direction of a grating of said diffractive optical element and a second straight line that crosses the optical axis and is perpendicular to said first line;

an objective lens for focusing said main beam and said sub-beams onto an optical recording medium;

an astigmatism generation unit for providing astigmatism to light reflected from said optical recording medium; and a photodetector for receiving light transmitted through said astigmatism generation unit to receive the main beam and the sub-beams, wherein a phase of the grating in said first region and said second region located diagonally with respect to said first region is different from a phase of the grating in said third region and said fourth region that are adjacent to said first and second regions and are located diagonally by substantially $\pi$, and the main beam and the sub-beams are focused in a region containing the same track on said optical recording medium;

an error signal generation circuit for generating focusing error signals of said main beam and said sub-beams by an astigmatism method based on a detection signal of said photodetector and outputting a sum of the focusing error signals of said main beam and said sub-beams as a focusing error signal for a focusing-servo operation; and an objective lens driving unit for controlling a position of said objective lens based on said focusing error signal for the focusing-servo operation.

8. The optical information recording or reproducing apparatus according to claim 7, wherein said error signal generation circuit generates tracking error signals of said main beam and said sub-beams by a push-pull method based on the detection signal of said photodetector and further outputs a difference between the tracking error signal of the main beam and the tracking error signal of the sub-beams as a tracking error signal for a tracking-servo operation, and said objective lens driving unit further controls the position of said objective lens based on said tracking error signal for the tracking-servo operation.

9. The optical information recording or reproducing apparatus according to claim 7, further comprising light source driving unit for controlling an output of said light source.

10. The optical information recording or reproducing apparatus according to claim 9, wherein said light source driving unit drives said light source based on recording data externally input thereto.

11. The optical information recording or reproducing apparatus according to claim 9, wherein said light source driving unit drives said light source with a constant output.

12. The optical head device according to claim 2, wherein said main beam is zero-th order light transmitted through said diffractive optical element, and said sub-beams are minus first order diffracted light and plus first order diffracted light that have been diffracted by said diffractive optical element.

13. The optical information recording or reproducing apparatus according to claim 8, further comprising light source driving unit for controlling an output of said light source.

14. The optical information recording or reproducing apparatus according to claim 13, wherein said light source driving unit drives said light source based on recording data externally input thereto.

15. The optical information recording or reproducing apparatus according to claim 13, wherein said light source driving unit drives said light source with a constant output.

* * * * *